United States Patent Office 3,580,708
Patented May 25, 1971

3,580,708
METHOD OF FORMING CUTTING TOOL
MATERIALS CONSISTING OF ALUMINA
AND TITANIUM CARBIDE
Kazuki Ogawa, Fukuoka-shi, and Michito Miyahara,
Fukuoka-ken, Japan, assignors to Nippon Tungsten
Company, Ltd., Fukuoka-shi, Japan
No Drawing. Filed Mar. 6, 1969, Ser. No. 805,024
Int. Cl. B24d *3/02*; C04b *31/16*
U.S. Cl. 51—307                                1 Claim

ABSTRACT OF THE DISCLOSURE

A method of preparing cutting tool materials comprising mixing alumina and titanium carbide particles having an average grain size of less than 3 microns placing said mixture in a graphite mold and hot pressing at a temperature between 1500–1800° C. and a pressure between 150–400 kg./sq. cm. for a period of time up to 40 minutes.

The present invention relates to preparation of new cutting tool materials consisting mainly of alumina and titanium carbide.

The desired properties of cutting tool materials are: high hardness and wear resistance; high mechanical strength, e.g. good bending and compressive strengths to resist fracture or chipping; preservation of the above-mentioned properties in a form of tool tip at an elevated temperature caused by cutting operation; resisting property to oxidation at a high temperature; and no affinity to cut metallic material. The more important property is the thermal shock resistance so that there is no cracking in the tool surface when subjected to sudden heating or cooling. This property is most required especially in intermittent cutting operations which produce repetitious heating and cooling cycles having a tendency to cause cracking or chipping of a tool.

With the recent trend of high speed cutting operation, the presently available super hard alloys have been developed into ceramic materials, and several products of such ceramic material have so far been disclosed. The ceramic materials are generally consisting of alumina as its major component, and the ceramic tools are prepared from alumina particles, incorporated with a small amount of $ZnO_2$, $MgO$, $NiO$, $Cr_2O_3$, $TiO_2$, $Mn_2O_3$, $Cu_2O$, $Ta_2O_5$ through the sintering process. These sintered products composed of fine alumina particles having a size less than 10 microns have been improved in their hardness and mechanical strength. However, they have a defect of low thermal shock resistance inherent to oxide sintered product, and when used in a tool tip sometimes cause thermal cracking.

The most important feature of the present invention is provision of novel tool materials containing alumina particles and a variety of amount of titanium carbide particles. Tools produced by sintering of said material have superior properties than the prior art ceramic tools in mechanical strength and wear resistance, and further in thermal shock resistance. They may be produced by the steps of placing an amount of mixed particles of alumina and 15–80% of titanium carbide in a graphite mold, and sintering in a hot press under conditions of a temperature ranging from 1500 and 1800° C. and a pressure ranging from 100 and 400 kg./sq. cm, rendering a uniform sand high density to the product. Some attempts to produce such tools by the steps of placing the mixture containing a large amount of titanium carbide into a metal mold, conventional press forming and sintering in a furnace were unsuccessful because the titanium carbide was affected by the furnace atmosphere during the sintering step, causing oxidization or decarburization. Therefore, it is essential to control carefully the furnace atmosphere to produce even products, but such procedure is quite difficult in practical production.

The alumina particles to be sintered in a hot press must be of its purity more than 99.6% and of its average diameter less than 1 micron, having the size distribution ranging of 0.1–5 microns, there being no large particle having a diameter more than 5 microns. It is preferable to add magnesium oxide in an amount of 0.1–0.5% to the alumina particles so as to avoid particle growth during the sintering operation. On the other hand, the titanium carbide particles must be of carbon content between from 12.5 to 20.05% and free carbon content less than 1%, and have an average grain size less than 3 microns and size distribution ranging of 0.2–0.5 micron, there being no large particle having a diameter above 6 microns.

The preferred embodiments of the invention will be described in the following examples.

Example 1

Ammonium alum $(NH_4)SO_4Al_2(SO_4)_3 \cdot 24H_2O$ is mixed with basic magnesium carbonate $(MgCO_3)_4Mg(CH)_2 \cdot 5 H_2O$ and heated up to 1200° C. Upon decomposition of the mixture there is obtained alpha-alumina particles added with magnesium oxide having diameter ranging of 0.2–0.5 micron. The added amount of the basic magnesium carbonate is calculated so as to produce 0.4% addition of magnesium oxide. The resulting fine particles are mixed with titanium carbide particles, the total carbon content of the mixture being 12.5–20.50%, and of high purity (free carbon content less than 1%), average grain size being 3 microns. The mixture is prepared from 140 gr. of alumina and 60 gr. of titanium carbide and ground thoroughly in a wet ball-mill. After removal from the mill the mixture is dried to prepare starting materials. The graphite mold used in the hot press is composed of a hollow cylinder having a dimension of 50 mm. and 120 mm. of the inner and outer diameters and 100 mm. of the height, and a pair of pushers arranged in the central cavity. Into said cavity 454 gr. of the mixed powder are placed. The mold is then placed in a high frequency furnace formed by wound copper pipe, and the mixture therein is hot pressed under a temperature of 1620° C. and pressure of 200 kg./sq. cm. for 40 minutes. After releasing the pressure &and permitting air cooling there is obtained a sintered product having a diameter of 50 mm. and 5.5 mm. in thickness.

The product is then cut by a diamond cutter and polished into a throw-away-type tip having a dimension of 13 x 13 x 5 mm. and a nose radius of 0.88 mm. The specific gravity of the tip is 4.21 and the hardness $H_{RA}$ is 93.0.

EXAMPLE 2

The same alumina and titanium carbide powder as Example 1 are measured to 80 and 120 gr. respectively and ground in a wet ball mill. After removal from the mill and drying, a particle mixture is obtained.

The same graphite mold as in Example 1 containing 460 gr. of the mixture is used in the hot press which is compressed under a pressure of 200 kg./sq. cm. and a temperature of 1635° C. for 40 minutes. After releasing the pressure and air cooling a disc having the diameter of 50 mm. and thickness of 5.5 mm. is obtained. The disc is machined into a throw-away-type tip having a dimension of 13 x 13 x 5 mm. and nose radius of 0.8 mm. The tip has the specific gravity of 4.39 and hardness of $H_{RA}$ 92.6.

Besides the above described Examples 1 and 2 many test pieces are produced by varying the mixing ratio of the components. These test pieces including Examples 1 and 2 are listed in the following table:

TABLE 1

| Test piece Number | Al₂O₃, percent | TiC, percent | Properties Spec. Grav. | H_RA | Temp., °C. | Hot-pressing Pressure (kg./sq. cm.) | Time (min.) | Remarks |
| --- | --- | --- | --- | --- | --- | --- | --- | --- |
| 1 | 100 | 0 | 3.99 | 93.4 | 1,500 | 200 | 40 | |
| 2 | 95 | 5 | 4.03 | 93.3 | 1,530 | 200 | 40 | |
| 3 | 90 | 10 | 4.05 | 93.2 | 1,550 | 200 | 40 | |
| 4 | 80 | 20 | 4.10 | 94.4 | 1,500 | 200 | 40 | |
| 5 | 70 | 30 | 4.21 | 93.0 | 1,620 | 200 | 40 | Example 1. |
| 6 | 60 | 40 | 4.22 | 92.6 | 1,545 | 200 | 40 | |
| 7 | 50 | 50 | 4.34 | 92.2 | 1,635 | 200 | 40 | |
| 8 | 40 | 60 | 4.39 | 92.6 | 1,635 | 200 | 40 | Example 2. |
| 9 | 20 | 80 | 4.67 | 91.1 | 1,800 | 200 | 10 | |
| 10 | 0 | 100 | 4.91 | 91.0 | 1,800 | 200 | 10 | |

After a series of experiments, it is found that to obtain a product having its density more than 95% of the theoretical value, a temperature more than 1500° C. and compression from the minimum value of 150 kg./sq. cm. to the maximum value of approximately 400 kg./sq. cm. corresponding to the ultimate strength of the mold, preferably 200 kg./sq. cm., in the hot pressing conditions are satisfactory. With a higher temperature the compression time may be reduced, but a temperature higher than 1800° C. should be avoided because such temperature in a hot pressing will cause growth of the grains in the sintered product, reducing the hardness as well as the mechanical strength.

Then a series of throw-away-type tips having a dimension of 13 x 13 x 5 mm. and nose radius of 0.8 mm. are formed from each example and subject to a cutting test as described below. As No. 11 test piece, a product is prepared from the commercially available alumina and by cold pressing and sintering procedures.

Test cylinder of gray cast iron having a diameter of 180 mm. and a length of 600 mm., tensile strength of 20 kg./sq. cm. and hardness of HB201 is previously cut into its periphery of many parallel grooves of a width of 5 mm. apart each other 20 mm. by a cutting-off tool. Then the peripherical projections are cut intermittently with the test tips. The other cutting conditions are as follows:

Tool holder—
    Clamp type with an adjustable tip braker
    Back rake angle: —5°
    Side rake angle: —6°
    End relief angle: +5°
    Side relief angle: +6°
    End cutting edge angle: 15°
    Side cutting edge angle: 15°
Cutting speed—200 m./min.
Feed—0.32 mm./rev.
Depth of cut—2 mm.

The cutting is conducted in the above-mentioned procedure, and the life end of the tool is determined by the tip fracture or 0.2 mm. of frank wear. The life is evaluated by the number of the cut projections. The test results are shown in the Table 2.

TABLE 2

| Test No.: | Tool life |
| --- | --- |
| 1 | 30 |
| 2 | 33 |
| 3 | 35 |
| 4 | 85 |
| 5 | 160 |
| 6 | 130 |
| 7 | 125 |
| 8 | 168 |
| 9 | 112 |
| 10 | 28 |
| 11 | 35 |

The above table shows that the tool material containing alumina and titanium carbide in accordance with the present invention has an excellent quality in the intermittent cutting operations as shown in the examples, especially in Test Nos. 4–9. These tests have been carried out using two throw-away-type tips at its different two points, and the figures shown in the above table are an average of two point cuttings. In observation through a magnifying glass of the test tips, there can be found no thermal cracking in Nos. 4–9 tips.

Conssidering the above-mentioned resistance to thermal cracking which contributes to the long life of the tool, the following thermal shock tests are conducted. In this test, each tip having a dimension of 13 x 13 x 5 mm. is heated up to 230° C. for 30 minutes and then thrown into a water of temperature 22° C. In this test, all tips are cracked at their surfaces. The depth of the cracking are measured by gradual polishing off of each 0.005 mm. using a diamond grindstone and sufficient amount of abrasive. The results are shown in the following Table 3.

TABLE 3

| Example No.: | Depth of cracking, mm. |
| --- | --- |
| 1 | 1.220 |
| 2 | 1.225 |
| 3 | 1.225 |
| 4 | 0.625 |
| 5 | 0.650 |
| 6 | 0.625 |
| 7 | 0.640 |
| 8 | 0.625 |
| 9 | 0.630 |
| 10 | 1.310 |

The above table shows clearly that the products in Example Nos. 4–9 have superior resistance to the thermal shock.

All percentages described in the specification and claim are based on weight.

The embodiments of the invention in which an exclusive property or privilege is claimed are defined as follows:

1. Preparation of cutting tool materials comprising steps of thoroughly mixing alumina and titanium carbide particles in a proportion of 20–80%: 80–20%, said alumina particles being of its purity more than 99.6%, average grain size less than 1 micron, and size distribution of 0.1–5 microns without any large particle more than 5 microns, said titanium carbide particles being of its purity including the total carbon content of 19.5–20.05% and free carbon less than 1%, average grain size less than 3 microns, and size distribution of 0.2–5 microns without any large particle more than 6 microns, placing said mixture in a graphite mold, and hot pressing the same under the conditions of a temperature in a range of 1500–1800° C. and a pressure of 150–400 kg./sq. cm. for a period of time up to 40 minutes.

References Cited

UNITED STATES PATENTS

| | | | |
| --- | --- | --- | --- |
| 2,798,809 | 7/1957 | Goetze et al. | 51—307 |
| 2,849,305 | 8/1958 | Frost | 51—309 |
| 3,409,416 | 11/1968 | Yates | 51—307 |

DONALD J. ARNOLD, Primary Examiner

U.S. Cl. X.R.

51—309